United States Patent [19]

Ehlers et al.

[11] Patent Number: 5,658,992
[45] Date of Patent: Aug. 19, 1997

[54] POLYETHYLENE COMPOSITION FOR INJECTION MOLDING

[75] Inventors: Jens Ehlers, Oberhausen; Norbert Freisler, Dortmund; Hermann van Laak, Hünxe, all of Germany

[73] Assignee: Hoechst Aktiengesellschaft, Germany

[21] Appl. No.: 592,222

[22] Filed: Jan. 26, 1996

Related U.S. Application Data

[63] Continuation of Ser. No. 373,498, Jan. 17, 1995, abandoned, which is a continuation of Ser. No. 195,812, Feb. 14, 1994, abandoned.

[30] Foreign Application Priority Data

Mar. 24, 1993 [DE] Germany .................... 43 09 456.2

[51] Int. Cl.$^6$ .................................................... C08L 23/04
[52] U.S. Cl. .................................. 525/240; 525/191
[58] Field of Search ............................. 525/240, 191

[56] References Cited

U.S. PATENT DOCUMENTS 5,079,287 1/1992 Takeshi et al. .................... 524/528

FOREIGN PATENT DOCUMENTS 318190 5/1989 European Pat. Off. ......... C08L 23/06

Primary Examiner—Paul J. Thibodeau
Assistant Examiner—Mary Critharis
Attorney, Agent, or Firm—Bierman, Muserlian and Lucas LLP

[57] ABSTRACT

Polyethylene compositions, which can be processed by injection molding, comprising 40% to 99% of a polyethylene having a limiting viscosity number of 1000 to 5000 ml/g and 60% to 1% of a polyethylene having a limiting viscosity number of 100 to 700 ml/g. The molecular weight distribution of each of the polyethylene components is less than 9. The limiting viscosity number of the compositions is at least 1500 ml/g. Shaped articles produced from these compositions have excellent wear resistance, high notched impact strength, and do not delaminate.

5 Claims, No Drawings

POLYETHYLENE COMPOSITION FOR INJECTION MOLDING

This application is a continuation of application Ser. No. 08/373,498, filed Jan. 17, 1995, now abandoned, which is a continuation of Ser. No. 08/195,812, filed on Feb. 14, 1994, now abandoned.

This Application claims the benefit of the priority of German Application P 43 09 456.2, filed Mar. 24, 1993.

The present invention relates to polyethylene compositions comprising ultra-high molecular weight polyethylene (PE-UHMW) for injection molding.

BACKGROUND OF THE INVENTION

Among the polyethylenes, the PE-UHMW types occupy a special position. These are understood as meaning linear polyethylenes which have an extremely high melt viscosity and are obtained by the low pressure process. They are characterized by a limiting viscosity number of 1000 to 5000 ml/g.

Ultra-high molecular weight polyethylene is characterized by a number of physical parameters which open up various possible uses to it. Its high wear resistance, its low coefficient of friction with respect to other materials, and its excellent toughness are worthy of being singled out. Moreover, it is remarkably resistant to numerous chemicals.

On the basis of its favorable tribological and chemical properties and its high toughness, PE-UHMW has found acceptance as a versatile material in very widely varying fields of use. Examples are the textile industry, mechanical engineering, the chemical industry, and mining.

A significant proportion of the PE-UHMW obtained as a powder during its synthesis is sintered by various processes to semi-finished products, from which shaped articles are produced by cutting, for very widely varying fields of use. However, there are often difficulties in producing shaped articles from PE-UHMW by the methods customary for thermoplastics. Ultra-high molecular weight polyethylene tends to form a skin to varying degrees (delamination) when processed by the conventional injection molding technique. The degree depends on the process parameters applied, particularly the length of the mold sections which are flat in the direction of flow. Flaky layers form on the surface of the molding and can easily be peeled off from the core material. This phenomenon leads to increased wear of the shaped article produced from PE-UHMW, which contrasts with the excellent wear resistance of workpieces produced by pressing processes. Various measures have been taken to eliminate this deficiency. They comprise, in particular, a special design of the injection molding machines or provision of modified ultra-high molecular weight polyethylenes which are suitable for injection molding.

According to DE-C-2,600,923, to form powder particles, molten PE-UHMW is injected at 140° to 300° C. and at a shear rate of 50,000 to 1 million second$^{-1}$, measured at the crosspiece of the injection nozzle, into a die cavity. The volume of the cavity is 1.5 to 3.0 times greater than the volume of the polyethylene injected, and the volume of the hollow mold is then reduced to less than 1.5 times that of the polyethylene injected.

FR-A-2,503,625 relates to a further development of the process described above. It comprises injecting PE-UHMW, heated to 170° to 240° C., into a mold cavity which increases its volume by at least 40% during this operation and decreases in size when the injection has ended, while the material in the mold is still in the molten state.

The two foregoing processes require the use of injection molding machines which are equipped with special molds, in particular those having variable hollow mold volumes. The usual injection molding units are unsuitable for carrying out these processes.

Instead of employing particular processing machines, special polymers have also been developed for the production of shaped articles from PE-UHMW by injection molding. U.S. Pat. No. 4,786,687 relates to ultra-high molecular weight polyethylenes which are suitable for processing by injection molding and are obtained in a two-stage process. In a first stage, ethylene is polymerized in the presence of a solid catalyst, comprising magnesium, titanium, and/or vanadium and an organometallic compound, in the absence of hydrogen. Ethylene is then polymerized in the presence of hydrogen in the same reactor in a second stage.

A polyethylene composition which comprises PE-UHMW and is suitable for injection molding is likewise obtained in a multi-stage process by a method described in EP-B-02 74 536. Ethylene is polymerized in at least one polymerization stage in the absence of hydrogen and in another polymerization stage in the presence of hydrogen. A catalyst of the Ziegler type, which comprises a highly active catalyst component containing magnesium, titanium, and halogen as essential constituents and an organoaluminum compound as a further catalyst component, is present in each of the individual reaction stages.

Finally, the patent literature also contains references to PE-UHMW compositions which are moldable and are prepared by mixing ultra-high molecular weight polyethylene with polyethylene or other polyolefins of lower molecular weight. According to the published Japanese Patent Application 177036/1982, such molding compositions comprise 100 parts of polyethylene having a molecular weight above $10^6$ and 10 to 60 parts of polyethylene having a molecular weight of 5000 to 20,000. The published Japanese Application 126446/1984 describes mixtures of 50 to 95 parts of ultra-high molecular weight polyethylene and 50 to 5 parts of an all-purpose polyolefin. None of the publications deals with processing of these compositions by injection molding.

SUMMARY OF THE INVENTION

It is, therefore, the object of the present invention to provide molding compositions which comprise ultra-high molecular weight polyethylene and can be processed to shaped articles on the usual injection molding machines. The highest possible PE-UHMW content in the molding composition should ensure that the shaped articles produced from it have an excellent wear resistance and an outstanding notched impact strength. All percentages set forth herein are by weight unless otherwise stated.

This object is achieved by polyethylene compositions for processing by injection molding which comprise 40% to 99% of a first polyethylene having a limiting viscosity number of 1000 to 5000 ml/g and 60% to 1% of a second polyethylene having a limiting viscosity number of 100 to 700 ml/g. The molecular weight distribution of each of the polyethylene components is less than 9 and the limiting viscosity number of the composition is at least 1000 ml/g. The polyethylene compositions according to the invention can be processed without problems on conventional injection molding machines to shaped articles which show no skin formation and which are distinguished by a high wear resistance and notched impact strength.

DETAILED DESCRIPTION OF THE INVENTION

The constituents of the novel polyethylene compositions are characterized by the limiting viscosity number [η], which is also called the Staudinger index or intrinsic viscosity. This is determined from the viscosity number η, in accordance with DIN 53 728, sheet 4, experimentally in decalin as the solvent at 135° C.; in accordance with the martin equation.

$$\log \eta = \log [\eta] + K \cdot [\eta] \cdot c$$

where K=0.139; c depends on the limiting viscosity number and is 0.03 g/dl for polyethylenes having a limiting viscosity number of 1000 to 5000 ml/g and 0.1 g/dl for polyethylenes having a limiting viscosity number of 100 to 700 ml/g.

The PE-UHMW content of the molding compositions is characterized by a limiting viscosity number between 1000 and 5000 ml/g, preferably 3000 to 4000 ml/g. The molding compositions comprise, as a further component, a polyethylene (PE-LMW), the limiting viscosity number of which is 100 to 700 ml/g, in particular 200 to 500 ml/g.

The components of the molding compositions according to the invention are additionally described by the molecular weight distribution. This term is understood as meaning the weight-average molecular weight ($M_w$) divided by the number-average molecular weight ($M_n$). The molecular weight distribution is determined by gel permeation chromatography (cf. Encycl. Pollan. Sci. Engng. volume 10, pages 12 et seq.). The molecular weight distribution of each of the polyethylene components is less than 9 and is preferably 4 to 8.

In the novel polyethylene compositions suitable for processing by injection molding, the PE-UHMW content is 40% to 99% an the PE-LMW content is 1% to 60% based on the composition. Compositions which comprise 60% to 80% of PE-UHMW and 40% to 20% of PE-LMW are preferred. The particular amount of polyethylene components in the composition depends on the limiting viscosity number of the components and is to be chosen so that the limiting viscosity number of the mixture is at least 1000 ml/g, preferably more than 1500 ml/g. The limiting viscosity number of the mixture $[\eta]_B$ is calculated from the equation.

$$[\eta]_B = (W_{LMW}[\eta]_{LMW}^{1/a} + W_{UHMW}[\eta]_{UHMW}^{1/a})^a$$

from the limiting viscosity numbers $[\eta]_{LMW}$ and $[\eta]_{UHMW}$ of the components and their content $W_{LMW}$ and $W_{UHMW}$ in the mixture in %. According to the Margolies relationship (Margolies, the Effect of Molecular Weight on the Physical Properties of HDPE, Plastics Div. Allied Chemical Corp., Clifton, N.J.) the exponent a has the value 0.67.

The components PE-UHMW and PE-LMW having the required limiting viscosity number and the required molecular weight distribution are prepared by known processes. DE-C-2 361 508 relates to a proven process which leads to polyethylenes of the PE-UHMW type having an average molecular weight, determined by viscometry, of at least 500,000, preferably $1 \times 10^6$ to $1 \times 10^7$. The process operates under pressures of 0.1 to 10 MPa and at temperatures of 30° to 130° C., using catalysts of titanium (III) halides and organic aluminum compounds. Other processes are also suitable, for example ethylene polymerization, which likewise proceeds under low pressures, in the presence of chromium oxide catalysts.

PE-LMW which meets the stated requirements is obtained, for example, by a procedure which is described in DE-C-2 837 481. In this procedure, specially prepared Ti (III) halides and organic aluminum compounds are used as catalysts, and the molecular weight of the polymer is regulated with oxygen and, if appropriate, hydrogen. The reaction proceeds at 20° to 250° C. under 0.1 to 10 MPa.

The polyethylene compositions according to the invention are prepared by homogeneous mixing of the starting materials in a suitable mixer. Other substances can be added to the polymer; these include customary processing auxiliaries and stabilizers, such as antistatics, corrosion inhibitors, and light and heat stabilizers. Coloring agents and/or fillers can also be constituents of the polymer mixture. Possible fillers are, for example, inorganic materials, such as silicic acid in its various naturally occurring or industrially produced forms, naturally occurring or industrial aluminum silicates or magnesium silicates, zeolites, calcium carbonate, and barium sulfate. Fillers can also be beads, for example of glass, and fibers, for example of glass, carbon, boron, polyesters or polyamides. Finally, lubricating and slip agents can be included.

The novel polyethylene compositions are described in more detail in the following examples. The invention, of course, is not limited to the embodiments described.

EXAMPLES

Two PE-UHMW and two PE-LMW types which are characterized by their limiting viscosity numbers ($[\eta]$) and molecular weight distributions (MWD) summarized in Table 1 are employed in the examples; polymers which meet the requirements according to the invention in respect of $[\eta]$ and MWD are described as true to type, and the others are described as not true to type.

TABLE 1

| Polyethylene | [η] ml/g | MWD | Comments |
| --- | --- | --- | --- |
| PE-UHMW 1 | 3500 | about 7 | true to type |
| PE-UHMW 2 | 3450 | about 15 | not true to type |
| PE-LMW 1 | 465 ± 15 | about 7 | true to type |
| PE-LMW 2 | 445 | about 15 | not true to type |

Mixtures which each comprise 80% PE-UHMW and 20% PE-LMW are prepared from the polyethylene components. The mathematically determined limiting viscosity numbers $[\eta]_B$ of the mixtures are shown in Table 2, as is the evaluation of whether the mixtures are true to type.

TABLE 2

| Mixtures | [η]$_B$ ml/g | Comments |
| --- | --- | --- |
| Mixture 1: PE-UHMW 1 + PE-LMW 1 | 3040 | true to type |
| Mixture 2: PE-UHMW 1 + PE-LMW 2 | 3035 | not true to type |
| Mixture 3: PE-UHMW 2 + PE-LMW 1 | 2995 | not true to type |
| Mixture 4: PE-UHMW 2 + PE-LMW 2 | 2995 | not true to type |

Polyethylenes PE-UHMW 1 and PE-LMW 1 and Mixtures 1 to 4 are processed on an injection molding machine (Mannesmann Demag D 175; closing force 1.75 t, screw diameter 52 mm) to form a shaped article having the external dimensions 180×50×36.5 mm and a wall thickness of 10 mm as a test specimen under the following conditions:

| | |
| --- | --- |
| Injection pressure | 135 MPa |
| Material temperature | 240 ± 5° C. |
| Mold temperature | 40 ± 5° C. |
| Screw advance | 30 mm/second |

The following experiment is carried out to evaluate the delamination properties:

A piece cut out of each test specimen having the dimensions 180×15×10 mm is inserted in a bending device such that the surfaces produced by injection molding are compressed (internal radius) or stretched (external radius) by about 40% at 2 places under angles of about 80°. The bending sites are far enough from the flow line in the center of the test specimen to insure that the material has filled the cavity. The quality of the surface in the compressed and the stretched regions, i.e. the tendency of different materials to form laminar structures, is evaluated visually.

TABLE 3

| Experiment | Material | Surfaces after bending |
|---|---|---|
| 1 | PE-UHMW 1 | cracked - flaked |
| 2 | PE-LMW 1 | flaked |
| 3 | Mixture 1 | smooth |
| 4 | Mixture 2 | cracked |
| 5 | Mixture 3 | smooth - cracked |
| 6 | Mixture 4 | cracked - flaked |

Table 3 shows that, in spite of a narrow molecular weight distribution, the individual components cannot be processed by injection molding to shaped articles which have perfect surfaces (Experiments 1, 2). The same applies if a PE component having a narrow molecular weight distribution and a PE component having a wide molecular weight distribution are combined with one another (Experiments 4, 5). Only mixtures of PE-UHMW and PE-LMW (Experiment 3), each of which have narrow molecular weight distributions, lead to shaped articles having a visually perfect surface when injection molded.

What we claim is:

1. A polyethylene composition for injection molding comprising:

(a) 40% to 99% by weight of a first polyethylene having a limiting viscosity number of about 1000 to about 5000 ml/g and a molecular weight distribution less than 9 and (b) 1% to 60% by weight of a second polyethylene having a limiting viscosity number of about 100 to about 700 ml/g and a molecular weight distribution less than 9, wherein the percentages are based on the composition, and wherein the limiting viscosity number of the composition is greater than 1500 ml/g, said limiting viscosity being determined in decalin at 135° C.

2. The polyethylene composition of claim 1 wherein the limiting viscosity number of said first polyethylene is 3000 to 4000 ml/g.

3. The polyethylene composition of claim 1 wherein the limiting viscosity number of said second polyethylene is 200 to 500 ml/g.

4. The polyethylene composition of claim 1 wherein said first polyethylene and said second polyethylene have a molecular weight distribution of 4 to 8.

5. The polyethylene composition of claim 1 wherein said composition contains 60% to 80% of said first polyethylene and 40% to 20% of said second polyethylene.

* * * * *